United States Patent
Schettino et al.

(10) Patent No.: US 12,339,744 B2
(45) Date of Patent: *Jun. 24, 2025

(54) DYNAMIC PARITY SCHEME

(71) Applicant: Micron Technology, Inc., Boise, ID (US)

(72) Inventors: Gennaro Schettino, Casamicciola Terme (IT); Luca Porzio, Casalnuovo (IT)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/626,135

(22) Filed: Apr. 3, 2024

(65) Prior Publication Data
US 2024/0345921 A1    Oct. 17, 2024

Related U.S. Application Data

(63) Continuation of application No. 17/888,299, filed on Aug. 15, 2022, now Pat. No. 11,977,443.

(51) Int. Cl.
*G06F 3/06* (2006.01)
*G06F 11/07* (2006.01)
*G06F 11/10* (2006.01)
*G06F 13/28* (2006.01)

(52) U.S. Cl.
CPC ........ *G06F 11/1068* (2013.01); *G06F 11/076* (2013.01); *G06F 11/108* (2013.01)

(58) Field of Classification Search
CPC ... G06F 11/1068; G06F 11/076; G06F 11/108
See application file for complete search history.

(56) References Cited

U.S. PATENT DOCUMENTS

| 8,694,855 B1 | 4/2014 | Micheloni et al. |
|---|---|---|
| 9,021,339 B2 | 4/2015 | Lu et al. |
| 10,248,497 B2 | 4/2019 | Nair et al. |
| 10,613,796 B2 | 4/2020 | Kanno et al. |
| 11,709,732 B2 | 7/2023 | Cadloni et al. |
| 11,977,443 B2 * | 5/2024 | Schettino .............. G06F 11/108 |
| 2011/0040932 A1 | 2/2011 | Frost et al. |
| 2014/0059301 A1 | 2/2014 | Rao |
| 2017/0097859 A1 | 4/2017 | Parthasarathy et al. |
| 2017/0177425 A1 | 6/2017 | Jei et al. |

(Continued)

*Primary Examiner* — Guy J Lamarre
(74) *Attorney, Agent, or Firm* — Holland & Hart LLP

(57) ABSTRACT

Methods, systems, and devices for a dynamic parity scheme are described. A memory system may include a memory device with multiple blocks of memory cells, where each block includes a first quantity of pages of memory cells storing data and a second quantity of pages of memory cells storing parity information associated with the data. In some cases, the memory system may increase the quantity of pages in a block of memory cells storing parity information to improve a reliability of the data stored in the block of memory cells. For example, the memory system may increase the quantity of pages storing parity information at the block of memory cells after performing a threshold quantity of access operations at the block of memory cells or in response to detecting more than a threshold quantity of errors in data stored at the block of memory cells.

20 Claims, 7 Drawing Sheets

(56) References Cited

U.S. PATENT DOCUMENTS

2017/0287564 A1 10/2017 Park et al.
2019/0189227 A1 6/2019 Yang et al.
2022/0269559 A1 8/2022 Singidi et al.

* cited by examiner

DYNAMIC PARITY SCHEME

CROSS REFERENCE

The present application for patent is a Continuation of U.S. patent application Ser. No. 17/888,299 by Schettino et al, entitled "DYNAMIC PARITY SCHEME," filed Aug. 15, 2022, which is assigned to the assignee hereof, and is expressly incorporated by reference herein.

FIELD OF TECHNOLOGY

The following relates to one or more systems for memory, including a dynamic parity scheme.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Figure 1:
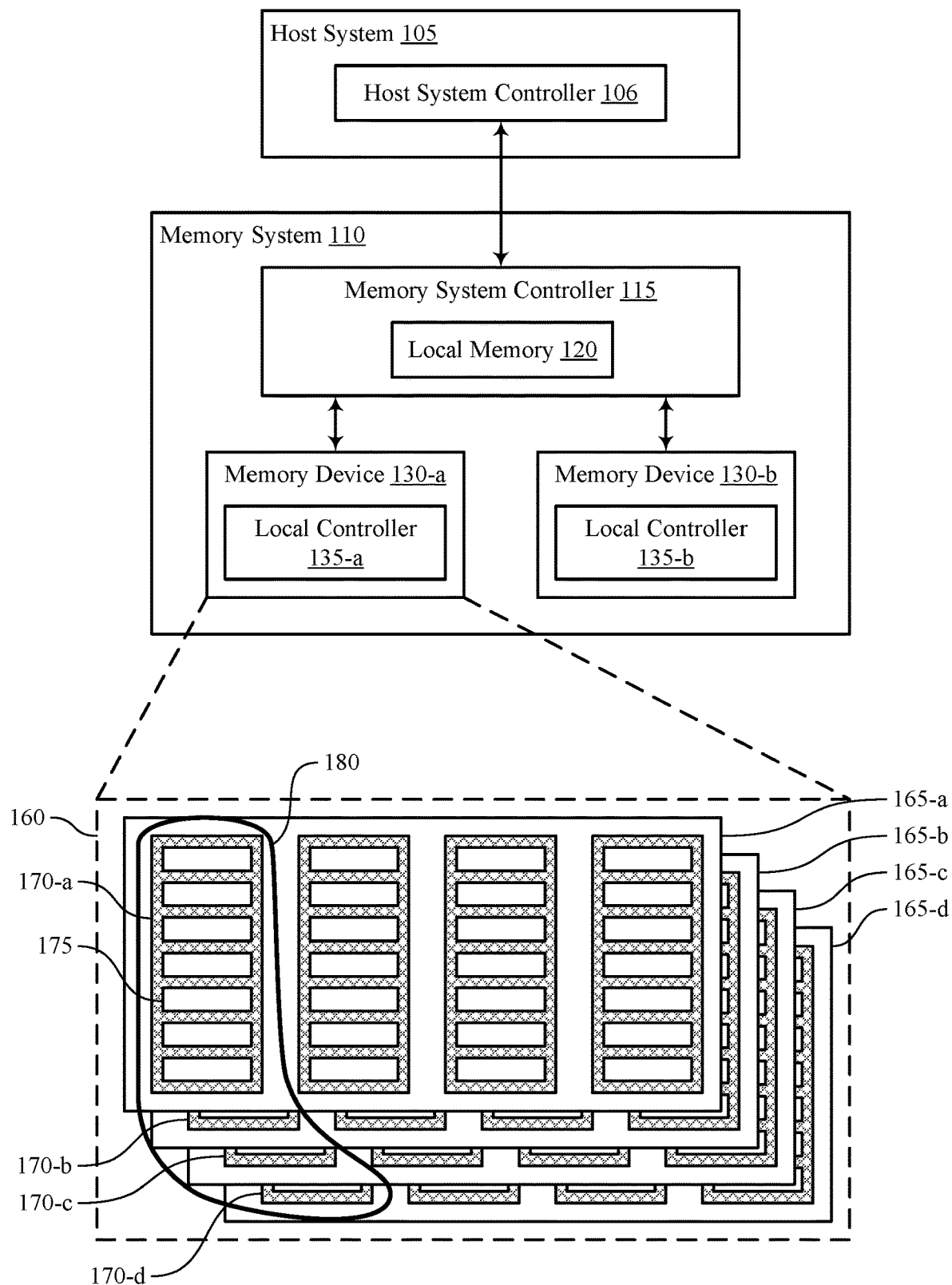
FIG. 1 illustrates an example of a system that supports a dynamic parity scheme in accordance with examples as disclosed herein.

Some memory systems may implement a data protection scheme to improve a reliability of data stored by one or more memory devices at the memory system. For example, a memory device (e.g., a not-and (NAND) memory device) may implement a redundant array of independent NAND (RAIN) data protection scheme for data retention purposes. Here, the memory system may perform a set of logical operations (e.g., exclusive OR (XOR) operations) on a set of data to be stored at the memory device to generate parity information associated with the set of data. Thus, the memory device may detect, and in some cases correct, errors in the set of data (e.g., during a read operation) using the parity information associated with the set of data. For example, the memory system may include a memory device with multiple blocks of memory cells, where each block of memory cells is statically configured with a first quantity of pages of memory cells configured to store data and a second quantity of pages of memory cells configured to store parity information associated with the data. In some cases, data stored within a block of memory cells having less pages storing parity information may be associated with a decreased reliability as compared to data stored within a block of memory cells having more pages storing parity information. Additionally, or alternatively, a block of memory cells having less pages storing parity information may be associated with an increased capacity for data storage as compared to a block of memory cells having more pages storing parity information.

The techniques as described herein provide for a memory device to dynamically configure a quantity of pages in each block of memory cells that stores parity information associated with the data stored by a remaining quantity of pages in the block of memory cells. That is, a reliability of data stored by one or more pages of memory cells at a memory device may change over time. For example, a reliability of data stored by a page of memory cells may decrease over time (e.g., as a quantity of access operations executed at the page of memory cells increases, as an amount of time that the page of memory cells has stored data increases). Thus, the memory system may increase the quantity of pages that store parity information in each block of memory cells of a memory device in response to detecting one or more conditions indicative of a decrease in reliability of data stored by the block of memory cells. For example, the memory system may determine to increase the quantity of pages of memory cells storing parity information in a block of memory cells in response to determining that more than a threshold quantity of access operations have been performed on the block of memory cells or in response to detecting more than a threshold quantity of errors in data stored in the block of memory cells.

By dynamically adjusting the quantity of pages of memory cells storing parity information at a memory device, the memory system may improve a data storage capacity of the memory device (e.g., by decreasing the quantity of pages of memory cells storing parity information) in cases that a reliability of data stored by the memory device is high, such as early on in a lifecycle of the memory device. Additionally, the memory system may improve a reliability of data stored at the memory device (e.g., by increasing the quantity of pages of memory cells storing parity information) to account for a decrease in reliability of data stored by the memory cells over time, such as later on in the lifecycle of the memory device.

Features of the disclosure are initially described in the context of a system with reference to FIG. 1. Features of the disclosure are then described in the context of a process flow and parity scheme configurations with reference to FIGS. 2 through 3C. These and other features of the disclosure are further illustrated by and described in the context of an apparatus diagram and flowchart that relate to a dynamic parity scheme with reference to FIGS. 4 and 5.

FIG. 1 illustrates an example of a system 100 that supports a dynamic parity scheme in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block 170 that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some examples, the memory system 110 may implement a data protection scheme to improve a reliability of data stored by one or more memory devices at the memory system. For example, the memory devices 130 in the memory system 110 may implement RAIN data protection schemes for data retention purposes. Here, the memory system 110 may perform a set of logical operations (e.g., XOR operations) on a set of data to be stored at the memory device 130 to generate parity information associated with the set of data. Thus, the memory system 110 may detect, and in some cases correct, errors in the set of data (e.g., during a read operation) using the parity information associated with the set of data. For example, the memory system 110 may include a memory device 130 with a set of blocks 170, where each block 170 is statically configured with a first quantity of pages 175 configured to store data and a second quantity of pages 175 configured to store parity information associated with the data. In some cases, data stored within a block 170 having less pages 175 storing parity information may be associated with a decreased reliability as compared to data stored within a block 170 having more pages 175 storing parity information. Additionally, or alternatively, a block 170 having less pages 175 storing parity information may be associated with an increased capacity for data storage as compared to a block 170 having more pages 175 storing parity information.

In the example of the memory system 110, the memory system 110 may dynamically configure a quantity of pages 175 in each block 170 (e.g., of the memory device 130) that stores parity information associated with the data stored by a remaining quantity of pages 175 in the block 170. That is, a reliability of data stored by one or more pages 175 at a memory device 130 may decrease over time (e.g., as a quantity of access operations executed at the page 175 increases, as an amount of time that the page 175 has stored data increases). Thus, the memory system 110 may increase the quantity of pages 175 in each block 170 that store parity information in response to detecting one or more conditions indicative of a decrease in reliability of data stored by the block 170. For example, the memory system 110 may determine to increase the quantity of pages 175 storing parity information in a block 170 in response to determining that more than a threshold quantity of access operations have been performed on the block 170 or in response to detecting more than a threshold quantity of errors in data stored in the block 170.

In some cases, the memory system 110 may increase a quantity of pages 175 within each memory device 130 that store parity information over time as a result of implementing a dynamic data protection scheme (e.g., a dynamic RAIN scheme). That is, during a first stage of a lifecycle of a memory device 130 (e.g., that occurs prior to one or more additional stages of the lifecycle of the memory device 130), the data stored by the memory device 130 may be generally more reliable. For example, the memory cells at the memory device 130 may be associated with a greater data retention characteristic during the first stage of the lifecycle as compared to one or more additional stages of the lifecycle of the memory device 130. Thus, during the first stage of the lifecycle of the memory device 130, the memory system 110 may configure a smaller quantity of pages 175 to store parity information. Here, a data storage capacity of the memory device 130 may be relatively high (e.g., as compared to the data storage capacity of the memory device 130 after the first stage of the lifecycle). Additionally, a latency associated with access operations may be relatively low (e.g., as compared to a latency associated with access operations after the first stage of the lifecycle). That is, because the memory device 130 generates and relies on less parity information during the first stage of the lifecycle of the memory device 130, the latency associated with access operations may be decreased.

During subsequent stages of the lifecycle of the memory device 130, the memory system 110 may increase a quantity of pages 175 that store parity information. For example, the memory system 110 may increase the quantity of pages 175 that store parity information in each block 170 over time. Additionally, or alternatively, the memory system 110 may adjust an error geometry of the parity information stored at the memory device 130 (e.g., a distribution of where parity information is stored in the memory device 130). That is, parity information may be concentrated to a smaller quantity of planes 165 or blocks 170 earlier in the lifecycle of the memory device 130. In some cases, during a first or second stage of the lifecycle of the memory device 130, a smaller quantity of planes 165 may include pages 175 that store parity information (e.g., due to the smaller quantity of planes 165 including blocks 170 associated with a decreased data retention characteristic during the earlier stages of the lifecycle of the memory device 130). For example, during the first stage of the lifecycle of the memory device 130, a single plane 165-*b* may include pages 175 storing parity information. Additionally, during subsequent stages of the lifecycle of the memory device 130, more planes 165 may include blocks 170 associated with a decreased data retention characteristic and as a result, the memory system 110 may configure more than one of the planes 165 may include pages 175 to store parity information. For example, during later stages of the lifecycle, the memory system 110 may configure many planes 165 to include pages 175 that store parity information (e.g., due to each block 170 including memory cells associated with the decreased data retention characteristics during the later stages of the lifecycle of the memory device 130).

By dynamically adjusting the quantity of pages 175 storing parity information at a memory device 130, the memory system 110 may improve a data storage capacity of the memory device 130 (e.g., by decreasing the quantity of pages 175 storing parity information) in cases that a reliability of data stored by the memory device 130 is high, such as early on in a lifecycle of the memory device 130. Additionally, the memory system 110 may improve a reliability of data stored at the memory device 130 (e.g., by increasing the quantity of pages 175 storing parity information) to account for a decrease in reliability of data stored by the memory cells over time, such as later on in the lifecycle of the memory device 130.

The system 100 may include any quantity of non-transitory computer readable media that support a dynamic parity scheme. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

Figure 2:
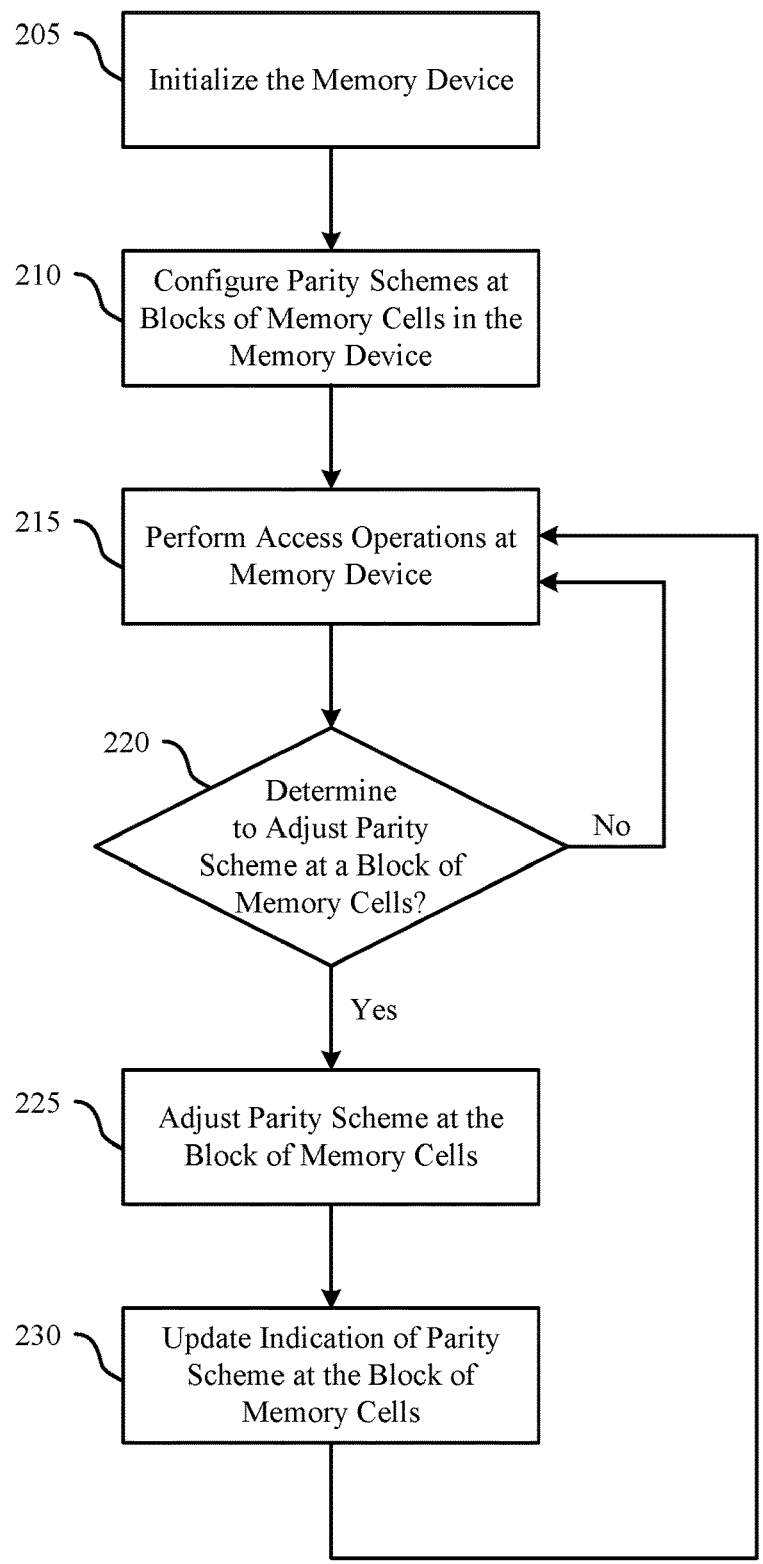
FIG. 2 illustrates an example of a process flow that supports a dynamic parity scheme in accordance with examples as disclosed herein.

FIG. 2 illustrates an example of a process flow 200 that supports a dynamic parity scheme in accordance with examples as disclosed herein. For example, a memory system, as described herein, may implement aspects of the process flow 200. While the features of the process flow 200 are described with reference to a single memory device, the memory system may include more than one memory device and perform one or more of the actions described with reference to the process flow 200 at each of the more than one memory devices. Aspects of the process flow 200 may be implemented by a controller, among other components. Additionally or alternatively, aspects of the process flow 200 may be implemented as instructions stored in memory (e.g., firmware stored in a memory coupled with a memory system controller or local controller, as described with reference to FIG. 1). For example, the instructions, when executed by a controller (e.g., a memory system controller 115, a local controller 135), may cause the controller to perform the operations of the process flow 200.

At 205, an initialization of the memory device may be performed by the memory system. For example, prior to relying on the memory device to store data (e.g., data associated with a host system, as described with reference to FIG. 1), the memory system may initialize each block of memory cells at the memory device. To initialize each block, the memory system may execute one or more tests on the blocks of memory cells to determine an initial reliability of the block. In some cases, executing the one or more tests on each block of memory cells may enable the memory system to identify any blocks of memory cells that are initially associated with a decreased data retention characteristic (e.g., during an initial stage of a lifecycle of the memory device). For example, by executing the one or more tests on the block of memory cells, the memory system may determine that many of the blocks of a memory device are reliable. Additionally, the memory system may determine that one or more blocks at the memory device are initially unreliable (e.g., the memory system determines that the block is an early bad block).

At 210, a parity scheme may be configured at the blocks of memory cells of the memory device in response to executing the one or more tests on the blocks of memory cells at the memory device at 205 (e.g., to determine whether an initial data retention characteristic of each block of memory cells is relatively good or relatively bad). That is, the memory system may configure, for each block of memory cells, an initial quantity of pages to store parity information, where the quantity of pages that are storing parity information may correspond to the parity scheme implemented by the block of memory cells at the memory device. In some cases, the memory system may configure the initial quantity of pages that store parity information in each block according to the determined initial data retention characteristic of each block, a quantity of bits of information stored by each memory cell in a block, or a combination thereof. For example, the memory system may configure a block of memory cells to include less pages of parity information in cases that the memory cells in the block are each configured to store a single bit of information (e.g., as compared to a block that includes memory cells that are each configured to store more than one bit of information). Additionally, or alternatively, the memory system may configure a block of memory cells to include more pages of parity information in cases that the memory system determines that the block of memory cells are associated with a data retention characteristic that is relatively bad (e.g., as compared to a block of memory cells associated with a data retention characteristic that is relatively good).

Additionally, for each block of memory cells at the memory device, the memory system may store an indication of the parity scheme implemented by the block of memory cells. Here, the indication may include a value indicative of the quantity of pages of memory cells in each block that are storing parity information. In some cases, the memory system may store the indication at the corresponding block of memory cells. Additionally, or alternatively, the memory system may store the indication in a portion of memory at the memory system that is configured to store metadata associated with the block of memory cells.

At 215, one or more access operations may be performed at the memory device by the memory system. For example, the memory system may perform a write operation at a block of memory cells (e.g., in response to receiving a write command from a host system). Here, the memory system may identify the data associated with the write operation and a block of memory cells at the memory device to store the data. Then, the memory system may identify the parity scheme implemented by the block of memory cells (e.g., by reading memory storing an indication of the parity scheme implemented by the block of memory cells). In response to identifying the parity scheme implemented by the block of memory cells, the memory system may optionally generate parity information associated with the data to be stored at the block of memory cells. For example, in cases that the memory system identifies that the block of memory cells is implementing a parity scheme associated with no parity information (e.g., none of the pages of memory cells at the block are configured to store parity information), the memory system may refrain from generating parity information associated with the data. Additionally, in cases that the memory system identifies that the block of memory cells is implementing a parity scheme associated with one or more pages of memory cells at the block being configured to store parity information, the memory system may generate an amount of parity information associated with the data that is indicated by the parity scheme implemented by the block. Then, the memory system may write the data to one or more pages of memory cells in the block and, in cases that the memory system generates parity information associated with the data, the memory system may additionally write the parity information to one or more other pages of memory cells in the block.

In another example, the memory system may perform a read operation at a block of memory cells (e.g., in response to receiving a read command from a host system). Here, the memory system may identify the block associated with the read operation (e.g., according to an address indicated by a read command indicative of the read operation). Then, the memory system may identify the parity scheme implemented by the block of memory cells by reading the memory storing the value indicative of the parity scheme implemented by the block of memory cells. In response to identifying the parity scheme implemented by the block of memory cells, the memory system may read the data associated with the read operation from one or more pages of memory cells at the block and, optionally, any parity information from one or more other pages of memory cells at the block. For example, in cases that the memory system identifies that the block of memory cells is implementing a parity scheme associated with no parity information, the memory system may not access any pages storing parity information at the block. Additionally, in cases that the memory system identifies that the block of memory cells is implementing a parity scheme associated with one or more pages of memory cells at the block being configured to store parity information, the memory cell may access the one or more pages to read the parity information associated with the data. Then, the memory system may rely on the parity information to detect, and in some cases correct, one or more errors in the data associated with the read operation.

In some cases, the memory system may additionally perform an error control operation as part of the access operation. For example, during an execution of a write operation, the memory system may perform an error control operation to generate and store error control information associated with the data (e.g., single error correction (SEC) codewords, single error correction double error detection (SECDED) codewords). Additionally, during an execution of a read operation, the memory system may perform an error control operation to generate error control information associated with the data and compare the generated error control information with the stored error control information to detect, and in some cases correct, errors within the data associated with the read operation.

At 220, a determination of whether to adjust the parity scheme at a block of memory cells may be made by the memory system. That is, at 220 the memory system may determine whether to increase a quantity of pages storing parity information in a block of memory cells. If at 220 the memory system determines to adjust the parity scheme at the block of memory cells, the memory system may proceed to 225. Additionally, in cases that at 220 the memory system determines to refrain from adjusting the parity scheme at the block of memory cells, the memory system may proceed to 215.

In some cases, the memory system may determine whether to increase the quantity of pages storing parity information in a block of memory cells in response to a quantity of access operations performed at the block of memory cells, a quantity of errors detected in data stored by the block of memory cells, or a combination thereof. In one example, the memory system may compare the quantity of access operations performed at the block of memory cells to a threshold and in cases that the quantity of access operations satisfies the threshold (e.g., exceeds the threshold, is the same as the threshold), at 220 the memory system may determine to adjust the parity scheme at the block of memory cells by increasing the quantity of pages storing parity information. In another example, the memory system may compare a quantity of errors detected in data read from the block of memory cells (e.g., during an access operation performed at the block of memory cells at 215) to a threshold. In cases that the quantity of errors detected satisfies the threshold (e.g., exceeds the threshold, is equal to the threshold), at 220 the memory system may determine to adjust the parity scheme at the block of memory cells by increasing the quantity of pages storing parity information.

In some cases, the memory system may select the threshold from a set of thresholds in response to a quantity of bits of information stored by the memory cells in the block, a parity scheme currently implemented by the block, or a combination thereof. For example, the memory system may select the threshold from a set of thresholds each corresponding to one of an SLC block, an MLC block, a TLC block, and a QLC block. Here, in cases that the block includes SLCs, the memory system may select a first threshold, and in cases that the block includes MLCs, the memory system may select another threshold. Additionally, the threshold quantity of access operations may decrease as the quantity of bits stored by the memory cells in the blocks increases. That is, the threshold associated with a block that includes SLCs may be larger than a block that includes MLCs, which may in turn be larger than a block that includes TLCs or QLCs. In another example, in cases that the block of memory cells is implementing a parity scheme associated with less pages storing parity information, the memory system may select a threshold that is smaller than a second threshold selected in cases that the block of memory cells is implementing a parity scheme associated with more pages storing parity information. For example, in cases that block includes no pages storing parity information, the memory system may select a threshold that is less than in cases that the block includes one or more pages storing parity information.

In some examples, the type of parity scheme used may be determined block-by-block. In such examples, each block may be tested and different parity schemes used. In some examples, the type of parity scheme used may be determined type of block-by-type of block. In such examples, the errors in SLC blocks may cause the parity scheme of SLC blocks to be adjusted independently of the parity schemes used in MLC blocks, TLC blocks, QLC blocks, or other types of blocks. In some examples, the type of parity scheme used may be determined for the memory system more generally. In such examples, once errors in the memory system satisfy a threshold or criterion, some or all blocks in the memory system may be adjusted to use the updated type of parity scheme.

At 225, the parity scheme at the block of memory cells may be adjusted. For example, the memory system may increase a quantity of pages in the block that store parity information and, in response to increasing the quantity of pages in the block that store parity information, decrease the quantity of pages in the block that store data. To adjust the parity scheme of a block of memory cells, the memory system may store the data from the block of memory cells and, in cases that the block of memory cells includes one or more pages storing parity in another block of memory cells, the parity information from the block of memory cells in another block of memory cells. Then, the memory system may erase the data and in some cases parity information from the block of memory cells. Then the memory system may reconfigure the block of memory cells to include a larger quantity of pages that store parity information and a smaller quantity of pages that store data. Thus, in subsequent write operations at the block of memory cells, the memory system may generate more parity information associated with less data for storage at the block of memory cells, which may increase a reliability of the data stored by the block even in cases that a data retention characteristic of the block of memory cells as declined (e.g., with respect to the data retention characteristic of the block of memory cells earlier in the life cycle of the memory device).

At 230, an indication of the parity scheme implemented at the block of memory cells may be updated by the memory system. For example, the memory system may update a value of the indication of the parity scheme implemented at the block of memory cells in response to adjusting the parity scheme at 225. That is, the memory system may update the value to be indicative of the block of memory cells including the larger quantity of pages configured to store parity information.

Figure 3A:
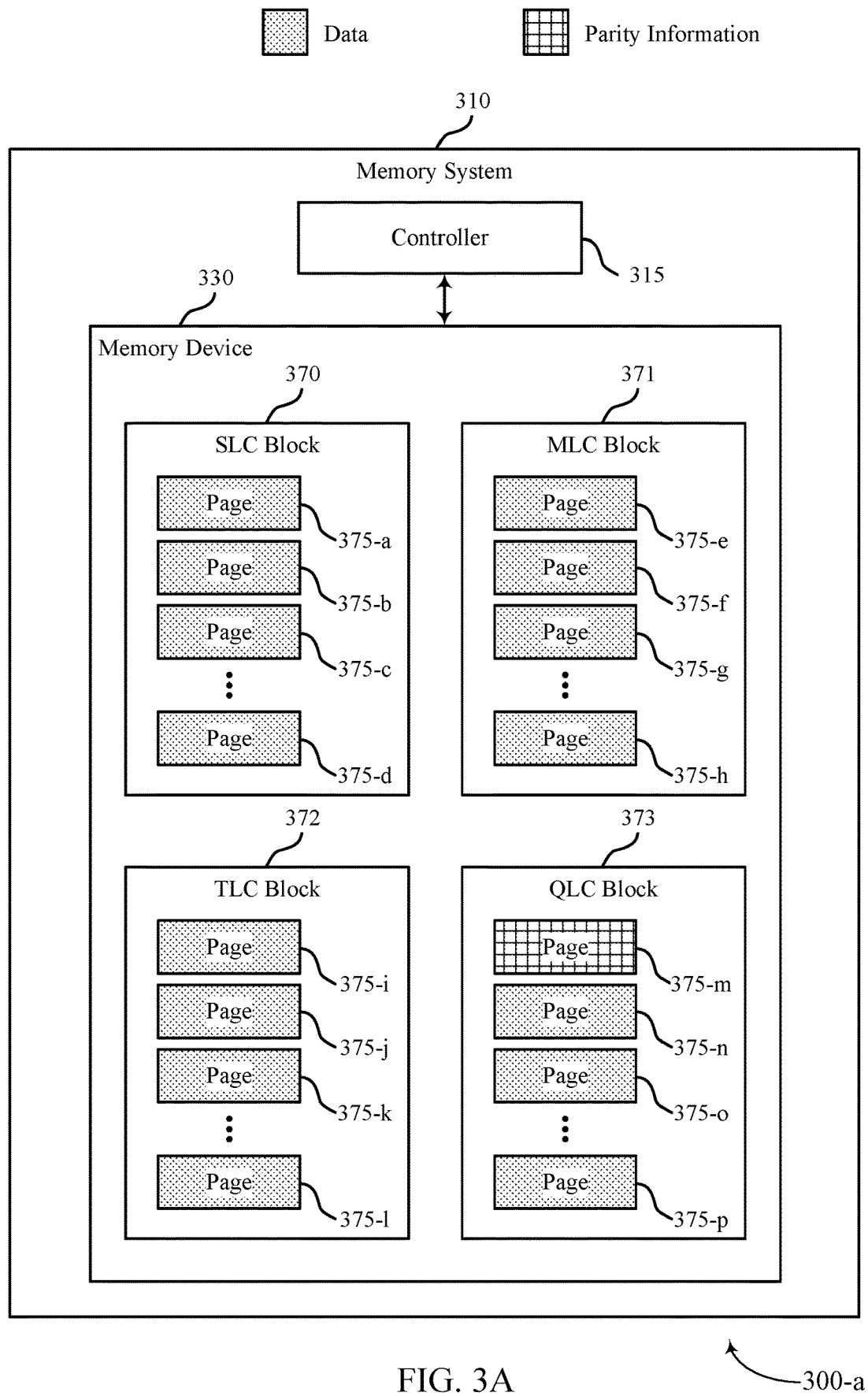
FIGS. 3A through 3C illustrate examples of parity scheme configurations that support a dynamic parity scheme in accordance with examples as disclosed herein.
Figure 3B:
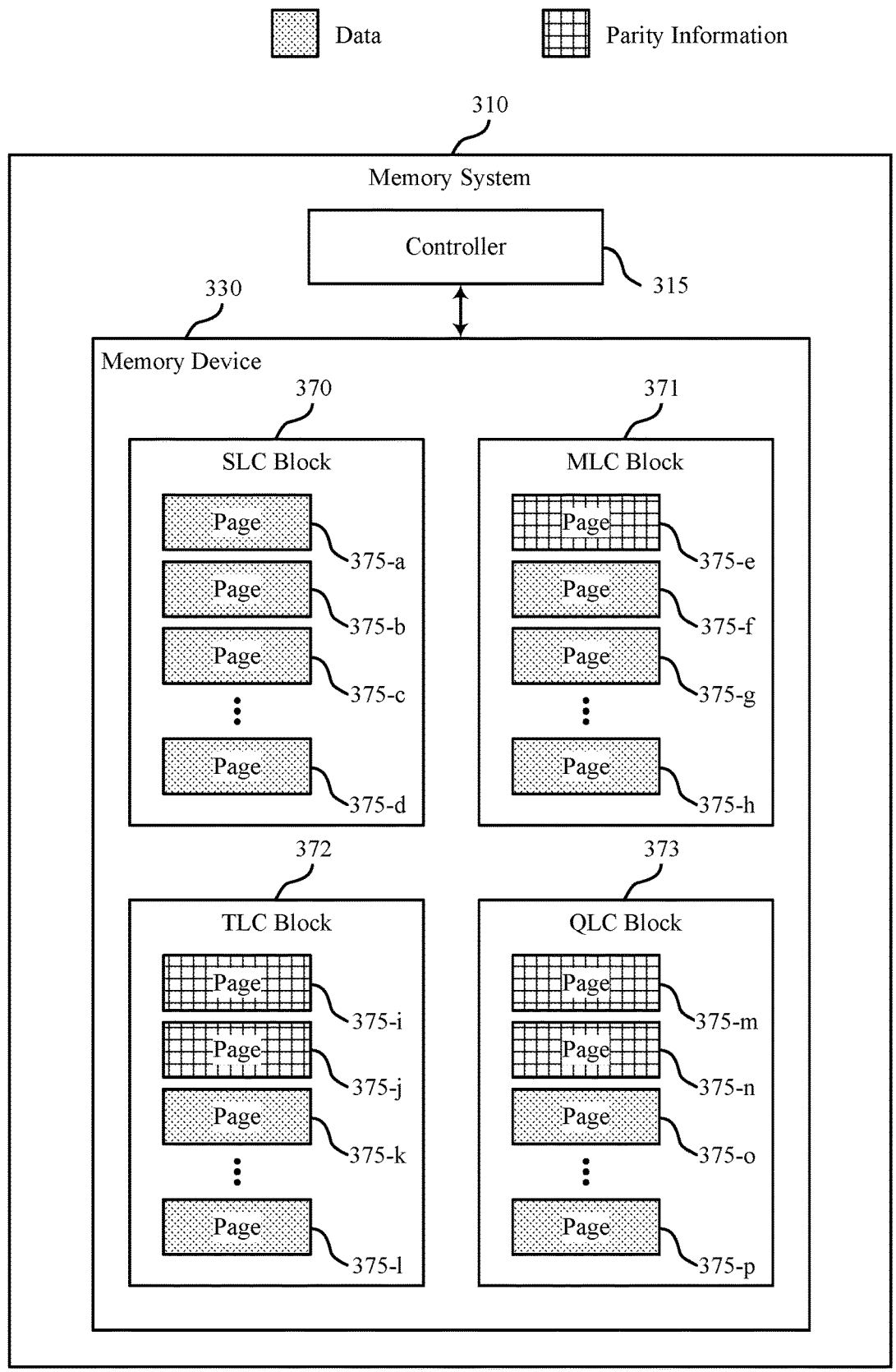

FIGS. 3A through 3B illustrate examples of parity scheme configurations 300 that supports a dynamic parity scheme in accordance with examples as disclosed herein. For example, the memory system 310 may be an example of a memory system as described with reference to FIGS. 1 and 2. Additionally, the memory system 310 may include a controller 315, which may be an example of a memory system controller or local controller as described with reference to FIG. 1. The memory system 310 may additionally include a memory device 330 with blocks of memory cells including an SLC block 370, an MLC block 371, a TLC block 372, and a QLC block 373, which may be examples of a memory device and blocks of memory cells as described with reference to FIGS. 1 and 2. The blocks of memory cells may each include pages 375 that store either data or parity information. In the example of the memory device 330, the SLC block 370 may correspond to a block of memory cells including SLCs, the MLC block 371 may correspond to a block of memory cells including MLCs, the TLC block 372 may correspond to a block of memory cells including TLCs, and the QLC block 373 may correspond to a block of memory cells including QLCs.

Figure 3C:
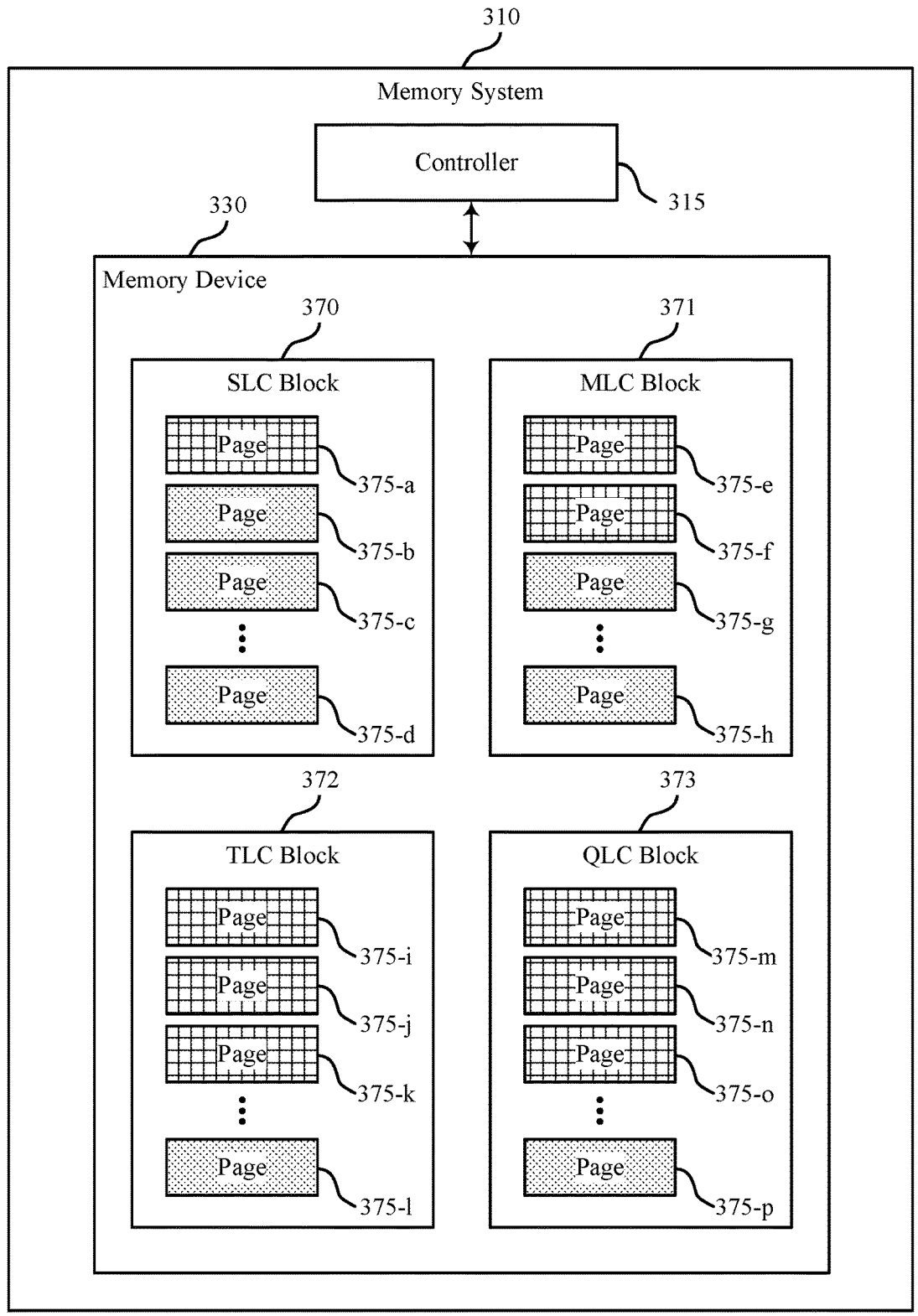

FIGS. 3A through 3C may illustrate examples of parity scheme configurations 300 implemented at the memory device 330 in various stages of a lifecycle of the memory device 330. For example, the parity scheme configuration 300-a may be implemented by the memory system 310 during an initial stage of the lifecycle of the memory device 330, the parity scheme configuration 300-b may be implemented by the memory system 310 during a middle stage of the lifecycle of the memory device 330, and the parity scheme configuration 300-c may be implemented by the memory system 310 during an end stage of the lifecycle of the memory device 330. In the example of the parity scheme configurations 300, the memory system may increase a complexity of the parity schemes implemented by the memory device 330 over time.

FIG. 3A may illustrate a relatively simple parity scheme configuration 300-a implemented by the memory system 310 during the initial stage of the lifecycle of the memory device 330. For example, in the parity scheme configuration 300-a, many of the blocks of memory cells (e.g., the SLC block 370, the MLC block 371, and the TLC block 372) may not include any pages 375 storing parity information, while the QLC block 373 includes a single page 375-m storing parity information. In some instances, the memory system 310 may implement the relatively simple parity scheme configuration 300-a during the initial stage of the lifecycle of the memory device 330 in response to the data retention characteristics of the blocks of memory cells (e.g., SLC block 370, MLC block 371, TLC block 372, and QLC block 373) being relatively high. That is, during the initial stage of the lifecycle of the memory device 330, the memory cells in the blocks may retain data reliably for a longer period of time (e.g., as compared to the memory cells during subsequent stages of the lifecycle of the memory device 330). In the example of the parity scheme configuration 300-a, a ratio of a quantity of pages 375 storing data to a quantity of pages 375 storing parity information in the memory device 330 during the initial stage of the lifecycle of the memory device 330 may be relatively high.

Additionally, a geometry of the parity scheme configuration 300-a may be concentrated (e.g., as opposed to disseminated throughout the memory device 330). For example, during the initial stage of the lifecycle of the memory device 330, a single plane of memory cells at the memory device 330 may include any pages 375 that store parity information. That is, the plane that includes the QLC block 373 may include one or more pages 375 that store parity information, but other planes at the memory device 330 (e.g., such as the planes of memory cells including the SLC block 370, the MLC block 371, the TLC block 372, or a combination thereof) by not include any pages 375 that store parity information.

FIG. 3B may illustrate a parity scheme configuration 300-b implemented by the memory system 310 during the middle stage of the lifecycle of the memory device 330. For example, the parity scheme configuration 300-b may be implemented by the memory system 310 at the memory device 330 after the parity scheme configuration 300-a. In some cases, the parity scheme configuration 300-b may correspond to a more complex parity scheme as compared to the parity scheme configuration 300-a implemented by the memory system 310 during the initial stage of the lifecycle of the memory device 330. That is, the memory system 310 may increase the complexity of the parity scheme implemented during the middle stage of the lifecycle of the memory device 330 in response to the data retention characteristics of the blocks of memory cells decreasing as compared to the initial stage of the lifecycle.

To increase the complexity of the parity scheme implemented by the parity scheme configuration 300-b (e.g., as compared to the parity scheme configuration 300-a), the memory system 310 may increase a quantity of pages 375 storing parity information in one or more of the blocks of memory cells at the memory device 330 to improve a reliability of data stored by the memory device 330. To accommodate the increased quantity of pages 375 storing parity information, the memory device 330 may additionally include less pages 375 storing data as compared to quantity of pages 375 storing data in the parity scheme configuration 300-a implemented during the initial stage of the lifecycle. In the example of the parity scheme configuration 300-b, a ratio of a quantity of pages 375 storing data to a quantity of pages 375 storing parity information in the memory device 330 during the middle stage of the lifecycle of the memory device 330 may be decreased as compared to the initial stage of the lifecycle of the memory device 330.

For example, the memory system 310 may implement a parity scheme associated with a single page 375-*e* storing parity information at the MLC block 371, a parity scheme associated with two pages 375-*i* and 375-*j* storing parity information at the TLC block 372, and a parity scheme associated with two pages 375-*m* and 375-*n* storing parity information at the QLC block 373. Additionally, the SLC block 370 may implement a relatively minimal parity scheme associated with no pages 375 storing parity information during the middle stage of the lifecycle of the memory device 330. That is, a reliability of the data stored in the SLC block 370 may still be relatively high during the middle stage of the lifecycle of the memory device 330 even in cases where the reliability of data stored by other blocks that include memory cells storing more than one bit of information (e.g., the MLC block 371, the TLC block 372, the QLC block 373) is decreasing.

Additionally, a geometry of the parity scheme configuration 300-*b* may be more disseminated in the parity scheme configuration 300-*b* implemented during the middle stage of the lifecycle of the memory device 330 as compared to the parity scheme configuration 300-*a* implanted during the initial stage of the lifecycle of the memory device 330. For example, more than one plane of memory cells may include pages 375 configured to store parity information (e.g., instead of a single plane including pages 375 storing parity information).

FIG. 3C may illustrate a parity scheme configuration 300-*c* implemented by the memory system 310 during the end stage of the lifecycle of the memory device 330. For example, the parity scheme configuration 300-*c* may be implemented by the memory system 310 at the memory device 330 after the parity scheme configuration 300-*b*. In some cases, the parity scheme configuration 300-*c* may correspond to a more complex parity scheme as compared to the parity scheme configuration 300-*b* implemented by the memory system 310 during the middle stage of the lifecycle of the memory device 330. That is, the memory system 310 may increase the complexity of the parity scheme implemented during the end stage of the lifecycle of the memory device 330 in response to the data retention characteristics of the blocks of memory cells further decreasing as compared to the middle stage of the lifecycle.

To increase the complexity of the parity scheme implemented by the parity scheme configuration 300-*c* (e.g., as compared to the parity scheme configuration 300-*b*), the memory system 310 may increase a quantity of pages 375 storing parity information in one or more of the blocks of memory cells at the memory device 330. To accommodate the increased quantity of pages 375 storing parity information, the memory device 330 may additionally include less pages 375 storing data as compared to quantity of pages 375 storing data in the parity scheme configuration 300-*b* implemented during the middle stage of the lifecycle. In the example of the parity scheme configuration 300-*c*, a ratio of a quantity of pages 375 storing data to a quantity of pages 375 storing parity information in the memory device 330 during the end stage of the lifecycle of the memory device may be relatively low.

For example, the memory system 310 may implement a parity scheme associated with at least one page 375-*a* storing parity information at the SLC block 370; at least two pages 375-*e* and 375-*f* storing parity information at the MLC block 371; at least three pages 375-*i*, 375-*j*, and 375-*k* storing parity information at the TLC block 372; and at least three pages 375-*m*, 375-*n*, and 375-*o* storing parity information at the QLC block 373. By implementing the parity scheme configuration 300-*c* associated with relatively large quantities of pages 375 storing parity information, the memory system may slow or decrease a degradation of the reliability of data stored by the memory device 330 even as the data retention characteristics of the memory cells at the memory device 330 decreases.

Additionally, a geometry of the parity scheme configuration 300-*c* may be more disseminated in the parity scheme configuration 300-*c* implemented during the end stage of the lifecycle of the memory device 330 as compared to the parity scheme configuration 300-*b* implanted during the middle stage of the lifecycle of the memory device 330. That is, most or all of the planes of memory cells at the memory device 330 may include one or more pages 375 storing parity information in the parity scheme configuration 300-*c*.

In some instances, the memory system may increase one or more performance metrics of the memory device 330 by implementing more simple parity schemes during earlier stages of a lifecycle of a memory device 330. For example, the data storage capacity of the memory device 330 may be larger in cases that the memory system 310 implements a more simple parity scheme (e.g., associated with decreased quantities of pages 375 storing parity information and increased quantities of pages 375 storing data). Additionally, the memory system may execute access operations with decreased latency in cases that the memory device 330 is configured according to a more simple parity scheme configuration 300. That is, increasing the complexity of a parity scheme being implemented by a block of memory cells at the memory device may result in a corresponding increase in latency associated with access operations at that block of memory cells. For example, in cases that a block of memory cells includes no pages 375 storing parity information (e.g., the SLC block 370 in the parity scheme configuration 300-*a* and 300-*b*), the memory system 310 may refrain from generating parity information or checking a parity of data read from that block of memory cells during an access operation. Additionally, as a quantity of pages 375 storing parity information in a block of memory cells increases, an overhead associated with generating that parity information or performing parity checks on data using that parity information may also increase, thus causing an increase in latency associated with access operations on blocks of memory cells implementing more complex parity schemes.

Additionally, the memory system 310 may increase an endurance of blocks of memory cells by implementing a less complex parity scheme during earlier stages of a lifecycle of the memory device 330 (e.g., as compared to an endurance of blocks of memory cells implementing a more complex parity scheme). That is, the data retention characteristic of blocks of memory cells implementing less complex parity schemes may decline slower as compared to blocks of memory cells implementing more complex parity schemes. In one case, the memory system may perform less write operations at pages 375 in the block as a result of storing less parity information at the block. In another case, the memory system may perform fewer flush operations (e.g., as a result of flushing RAIN cursors) at a block of memory cells that includes less pages 375 storing parity information. In either case, the memory system 310 may apply less write amplification signals to blocks of memory cells that implement less complex parity schemes, which may in turn increase an endurance of blocks of memory cells implementing the less complex parity schemes.

In some cases, increasing the quantity of pages 375 storing parity information at the memory device 330 may result in a decrease of garbage collection operations executed at the memory device 330. That is, the quantity of free pages 375 at the memory device 330 may decrease as a result of the increase in quantities of pages 375 storing parity information. Thus, garbage collection operations may occur less frequently as the memory device implements more complex parity scheme configurations 300.

Figure 4:
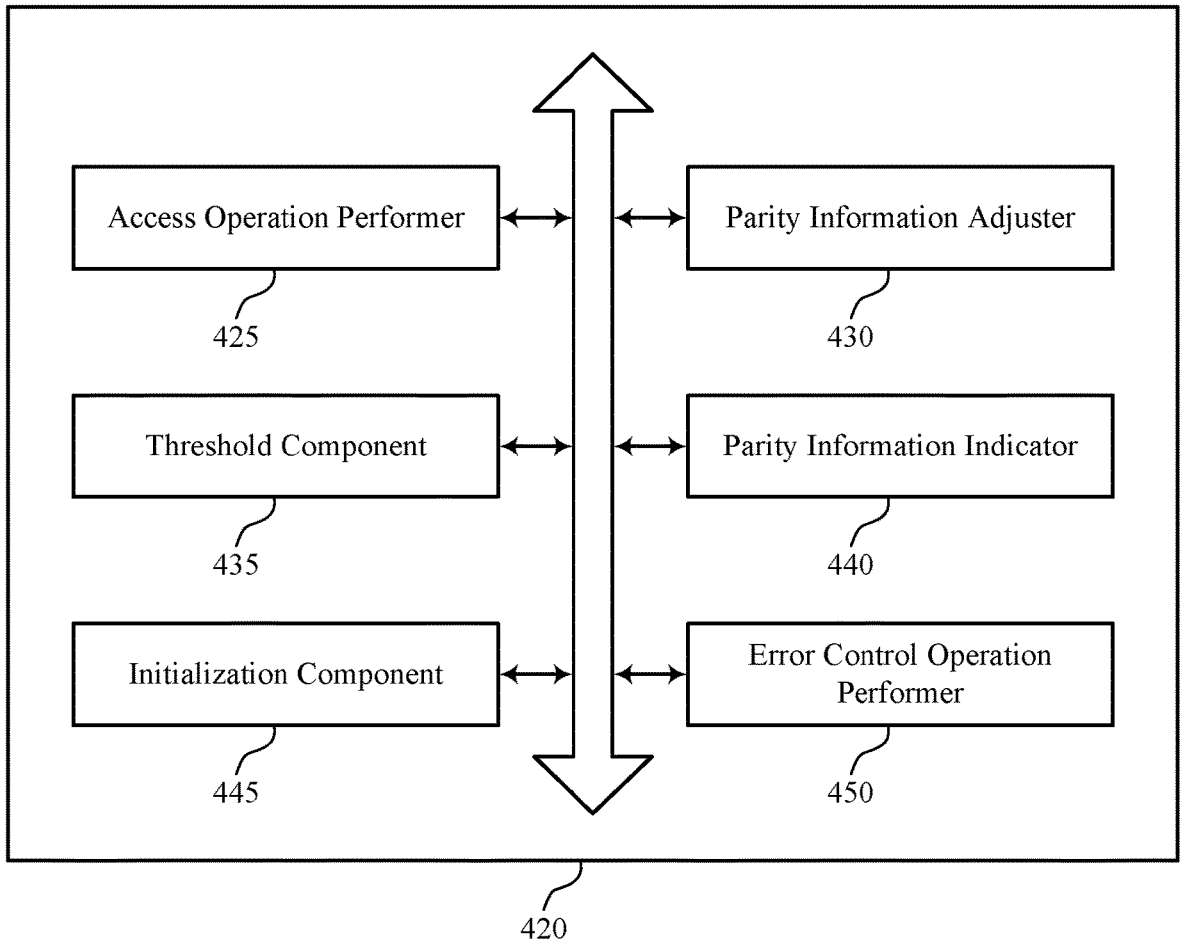
FIG. 4 shows a block diagram of a memory system that supports a dynamic parity scheme in accordance with examples as disclosed herein.

FIG. 4 shows a block diagram 400 of a memory system 420 that supports a dynamic parity scheme in accordance with examples as disclosed herein. The memory system 420 may be an example of aspects of a memory system as described with reference to FIGS. 1 through 3. The memory system 420, or various components thereof, may be an example of means for performing various aspects of a dynamic parity scheme as described herein. For example, the memory system 420 may include an access operation performer 425, a parity information adjuster 430, a threshold component 435, a parity information indicator 440, an initialization component 445, an error control operation performer 450, or any combination thereof. Each of these components may communicate, directly or indirectly, with one another (e.g., via one or more buses).

The access operation performer 425 may be configured as or otherwise support a means for performing a first access operation at a block of memory cells of a memory device, the block of memory cells including a first quantity of pages of memory cells storing data and a second quantity of pages of memory cells storing parity information associated with the data. The parity information adjuster 430 may be configured as or otherwise support a means for adjusting, based at least in part on performing the first access operation, a quantity of pages in the block of memory cells that store parity information from the second quantity of pages to a third quantity of pages. In some examples, the access operation performer 425 may be configured as or otherwise support a means for performing a second access operation at the block of memory cells based at least in part on adjusting the quantity of pages in the block of memory cells that store parity information from the second quantity of pages to the third quantity of pages.

In some examples, the threshold component 435 may be configured as or otherwise support a means for determining, based at least in part on performing the first access operation at the block of memory cells, whether a fourth quantity of access operations performed at the block of memory cells satisfies a threshold, where adjusting the quantity of pages that store the parity information is based at least in part on the fourth quantity of access operations satisfying the threshold.

In some examples, the threshold is based at least in part on a quantity of bits stored by each memory cell in the block of memory cells.

In some examples, the threshold component 435 may be configured as or otherwise support a means for determining, based at least in part on performing the first access operation at the block of memory cells, whether a fourth quantity of errors in the data satisfies a threshold, where adjusting the quantity of pages that store the parity information is based at least in part on the fourth quantity of errors satisfying the threshold.

In some examples, the error control operation performer 450 may be configured as or otherwise support a means for performing an error control operation on the data stored in the first quantity of pages of memory cells based at least in part on performing the first access operation. In some examples, the error control operation performer 450 may be configured as or otherwise support a means for detecting the fourth quantity of errors in the data based at least in part on performing the error control operation on the data, where determining whether the fourth quantity of errors in the data satisfies the threshold is based at least in part on detecting the fourth quantity of errors.

In some examples, the parity information indicator 440 may be configured as or otherwise support a means for updating an indication of the quantity of pages in the block of memory cells that store parity information from a first value indicating the second quantity of pages to a second value indicating the third quantity of pages based at least in part on adjusting the quantity of pages in the block of memory cells that store parity information.

In some examples, adjusting the quantity of pages in the block of memory cells that store the parity information includes increasing the quantity of pages in the block of memory cells that store parity information from the second quantity of pages to the third quantity of pages.

In some examples, the parity information adjuster 430 may be configured as or otherwise support a means for decreasing a quantity of pages in the block of memory cells that store data from the first quantity of pages to a fourth quantity of pages based at least in part on increasing the quantity of pages in the block of memory cells that store parity information.

In some examples, the initialization component 445 may be configured as or otherwise support a means for configuring the quantity of pages in the block of memory cells that store parity information to be the second quantity of pages based at least in part on initializing the block of memory cells, where performing the first access operation is based at least in part on the configuring.

In some examples, configuring the quantity of pages in the block of memory cells that store parity information is based at least in part on a quantity of bits stored by each memory cell in the block of memory cells, one or more characteristics of the block of memory cells detected based at least in part on initializing the block of memory cells, or a combination thereof.

In some examples, the parity information adjuster 430 may be configured as or otherwise support a means for erasing, based at least in part on adjusting the quantity of pages in the block of memory cells that store parity information, the data from the first quantity of pages in the block of memory cells and the parity information from the second quantity of pages in the block of memory cells, where performing the second access operation at the block of memory cells is based at least in part on erasing the data and the parity information from the block of memory cells.

In some examples, the parity information adjuster 430 may be configured as or otherwise support a means for identifying second data to store in the block of memory cells based at least in part on erasing the data and the parity information from the block of memory cells. In some examples, the parity information adjuster 430 may be configured as or otherwise support a means for generating second parity information associated with the second data, the second parity information based at least in part on the quantity of pages in the block of memory cells that store parity information being the third quantity of pages. In some examples, the parity information adjuster 430 may be configured as or otherwise support a means for storing the second data in a fourth quantity of pages of memory cells storing data in the block of memory cells. In some examples, the parity information adjuster 430 may be configured as or otherwise support a means for storing the second parity information in the third quantity of pages of memory cells storing parity information in the block of memory cells, where performing the second access operation at the block of memory cells is based at least in part on storing the second data and the second parity information in the block of memory cells.

In some examples, the parity information is associated with a RAIN data protection scheme.

In some examples, a second block of memory cells of the memory device includes a fourth quantity of pages of memory cells storing second data and a fifth quantity of pages of memory cells storing second parity information associated with the second data. In some examples, the fifth quantity of pages of memory cells is different than the second quantity of pages and the third quantity of pages.

In some examples, the block of memory cells includes memory cells configured to store a sixth quantity of bits. In some examples, the second block of memory cells includes memory cells configured to store the sixth quantity of bits.

Figure 5:
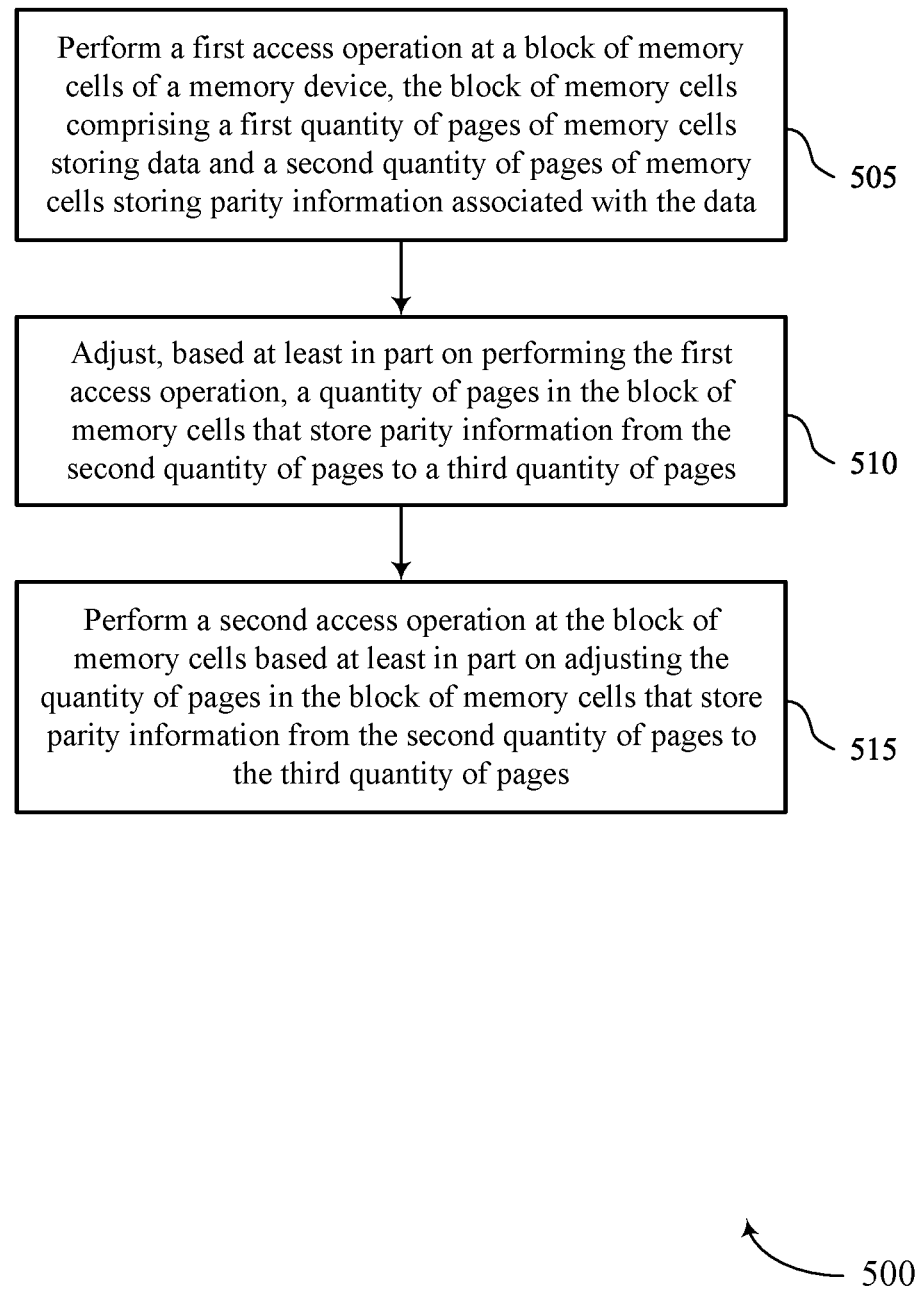
FIG. 5 shows a flowchart illustrating a method or methods that support a dynamic parity scheme in accordance with examples as disclosed herein.

FIG. 5 shows a flowchart illustrating a method 500 that supports a dynamic parity scheme in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include performing a first access operation at a block of memory cells of a memory device, the block of memory cells including a first quantity of pages of memory cells storing data and a second quantity of pages of memory cells storing parity information associated with the data. The operations of 505 may be performed in accordance with examples as disclosed herein. In some examples, aspects of the operations of 505 may be performed by an access operation performer 425 as described with reference to FIG. 4.

At 510, the method may include adjusting, based at least in part on performing the first access operation, a quantity of pages in the block of memory cells that store parity information from the second quantity of pages to a third quantity of pages. The operations of 510 may be performed in accordance with examples as disclosed herein. In some examples, aspects of the operations of 510 may be performed by a parity information adjuster 430 as described with reference to FIG. 4.

At 515, the method may include performing a second access operation at the block of memory cells based at least in part on adjusting the quantity of pages in the block of memory cells that store parity information from the second quantity of pages to the third quantity of pages. The operations of 515 may be performed in accordance with examples as disclosed herein. In some examples, aspects of the operations of 515 may be performed by an access operation performer 425 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for performing a first access operation at a block of memory cells of a memory device, the block of memory cells including a first quantity of pages of memory cells storing data and a second quantity of pages of memory cells storing parity information associated with the data; adjusting, based at least in part on performing the first access operation, a quantity of pages in the block of memory cells that store parity information from the second quantity of pages to a third quantity of pages; and performing a second access operation at the block of memory cells based at least in part on adjusting the quantity of pages in the block of memory cells that store parity information from the second quantity of pages to the third quantity of pages.

Aspect 2: The method, apparatus, or non-transitory computer-readable medium of aspect 1, further including operations, features, circuitry, logic, means, or instructions, or any combination thereof for determining, based at least in part on performing the first access operation at the block of memory cells, whether a fourth quantity of access operations performed at the block of memory cells satisfies a threshold, where adjusting the quantity of pages that store the parity information is based at least in part on the fourth quantity of access operations satisfying the threshold.

Aspect 3: The method, apparatus, or non-transitory computer-readable medium of aspect 2, where the threshold is based at least in part on a quantity of bits stored by each memory cell in the block of memory cells.

Aspect 4: The method, apparatus, or non-transitory computer-readable medium of any of aspects 1 through 3, further including operations, features, circuitry, logic, means, or instructions, or any combination thereof for determining, based at least in part on performing the first access operation at the block of memory cells, whether a fourth quantity of errors in the data satisfies a threshold, where adjusting the quantity of pages that store the parity information is based at least in part on the fourth quantity of errors satisfying the threshold.

Aspect 5: The method, apparatus, or non-transitory computer-readable medium of aspect 4, further including operations, features, circuitry, logic, means, or instructions, or any combination thereof for performing an error control operation on the data stored in the first quantity of pages of memory cells based at least in part on performing the first access operation and detecting the fourth quantity of errors in the data based at least in part on performing the error control operation on the data, where determining whether the fourth quantity of errors in the data satisfies the threshold is based at least in part on detecting the fourth quantity of errors.

Aspect 6: The method, apparatus, or non-transitory computer-readable medium of any of aspects 1 through 5, further including operations, features, circuitry, logic, means, or instructions, or any combination thereof for updating an indication of the quantity of pages in the block of memory cells that store parity information from a first value indicating the second quantity of pages to a second value indicating the third quantity of pages based at least in part on adjusting the quantity of pages in the block of memory cells that store parity information.

Aspect 7: The method, apparatus, or non-transitory computer-readable medium of any of aspects 1 through 6, where adjusting the quantity of pages in the block of memory cells that store the parity information includes increasing the quantity of pages in the block of memory cells that store parity information from the second quantity of pages to the third quantity of pages.

Aspect 8: The method, apparatus, or non-transitory computer-readable medium of aspect 7, further including operations, features, circuitry, logic, means, or instructions, or any combination thereof for decreasing a quantity of pages in the block of memory cells that store data from the first quantity of pages to a fourth quantity of pages based at least in part on increasing the quantity of pages in the block of memory cells that store parity information.

Aspect 9: The method, apparatus, or non-transitory computer-readable medium of any of aspects 1 through 8, further including operations, features, circuitry, logic, means, or instructions, or any combination thereof for configuring the quantity of pages in the block of memory cells that store parity information to be the second quantity of pages based at least in part on initializing the block of memory cells, where performing the first access operation is based at least in part on the configuring.

Aspect 10: The method, apparatus, or non-transitory computer-readable medium of aspect 9, where configuring the quantity of pages in the block of memory cells that store parity information is based at least in part on a quantity of bits stored by each memory cell in the block of memory cells, one or more characteristics of the block of memory cells detected based at least in part on initializing the block of memory cells, or a combination thereof.

Aspect 11: The method, apparatus, or non-transitory computer-readable medium of any of aspects 1 through 10, further including operations, features, circuitry, logic, means, or instructions, or any combination thereof for erasing, based at least in part on adjusting the quantity of pages in the block of memory cells that store parity information, the data from the first quantity of pages in the block of memory cells and the parity information from the second quantity of pages in the block of memory cells, where performing the second access operation at the block of memory cells is based at least in part on erasing the data and the parity information from the block of memory cells.

Aspect 12: The method, apparatus, or non-transitory computer-readable medium of aspect 11, further including operations, features, circuitry, logic, means, or instructions, or any combination thereof for identifying second data to store in the block of memory cells based at least in part on erasing the data and the parity information from the block of memory cells; generating second parity information associated with the second data, the second parity information based at least in part on the quantity of pages in the block of memory cells that store parity information being the third quantity of pages; storing the second data in a fourth quantity of pages of memory cells storing data in the block of memory cells; and storing the second parity information in the third quantity of pages of memory cells storing parity information in the block of memory cells, where performing the second access operation at the block of memory cells is based at least in part on storing the second data and the second parity information in the block of memory cells.

Aspect 13: The method, apparatus, or non-transitory computer-readable medium of any of aspects 1 through 12, where the parity information is associated with a RAIN data protection scheme.

Aspect 14: The method, apparatus, or non-transitory computer-readable medium of any of aspects 1 through 13, where a second block of memory cells of the memory device includes a fourth quantity of pages of memory cells storing second data and a fifth quantity of pages of memory cells storing second parity information associated with the second data and the fifth quantity of pages of memory cells is different than the second quantity of pages and the third quantity of pages.

Aspect 15: The method, apparatus, or non-transitory computer-readable medium of aspect 14, where the block of memory cells includes memory cells configured to store a sixth quantity of bits and the second block of memory cells includes memory cells configured to store the sixth quantity of bits.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for memory operations, comprising:
   processing circuitry associated with one or more memory devices and configured to cause the apparatus to:
   perform a first access operation according to a parity scheme at a plurality of blocks of memory cells storing data and parity information associated with the data;
   adjust, after performing the first access operation, the parity scheme for one or more blocks of memory cells of the plurality of blocks of memory cells; and
   perform a second access operation according to the adjusted parity scheme at the one or more blocks of memory cells.

2. The apparatus of claim 1, wherein the one or more blocks of memory cells comprise each block of memory cells of the plurality of blocks of memory cells that is of a block type, and wherein the block type indicates a quantity of bits stored by each memory cell in a block of memory cells.

3. The apparatus of claim 1, wherein the processing circuitry is further configured to cause the apparatus to:
   select, in accordance with one or more block types of the one or more blocks of memory cells, a threshold from a set of thresholds for a quantity of access operations, data errors, or both associated with adjusting the parity scheme.

4. The apparatus of claim 1, wherein the processing circuitry is further configured to cause the apparatus to:
   determine whether a quantity of access operations performed at at least one of the plurality of blocks satisfies a threshold, the quantity of access operations including the first access operation, wherein adjusting the parity scheme is in response to the determination.

5. The apparatus of claim 1, wherein the processing circuitry is further configured to cause the apparatus to:
   determine whether a quantity of errors in a portion of the data associated with the first access operation satisfies a threshold, wherein adjusting the parity scheme is in response to the determination.

6. The apparatus of claim 5, wherein, to detect the quantity of errors in the data, the processing circuitry is configured to cause the apparatus to:
   perform an error control operation on the portion of the data in response to performing the first access operation.

7. The apparatus of claim 1, wherein the parity scheme and the adjusted parity scheme indicate a quantity of pages of memory cells in each of the one or more blocks of memory cells that store the data and a quantity of pages of memory cells in each of the one or more blocks of memory cells that store the parity information associated with the data.

8. The apparatus of claim 7, wherein, to adjust the parity scheme, the processing circuitry is configured to cause the apparatus to:
   increase the quantity of pages in each of the one or more blocks of memory cells that store parity information.

9. A non-transitory computer-readable medium storing code for memory operations, the code comprising instructions executable by one or more processors to:
   perform a first access operation according to a parity scheme at a plurality of blocks of memory cells storing data and parity information associated with the data;
   adjust, after performing the first access operation, the parity scheme for one or more blocks of memory cells of the plurality of blocks of memory cells; and
   perform a second access operation according to the adjusted parity scheme at the one or more blocks of memory cells.

10. The non-transitory computer-readable medium of claim 9, wherein the one or more blocks of memory cells comprise each block of memory cells of the plurality of blocks of memory cells that is of a block type, and wherein the block type indicates a quantity of bits stored by each memory cell in a block of memory cells.

11. The non-transitory computer-readable medium of claim 9, wherein the instructions are further executable by the one or more processors to:
   select, in accordance with one or more block types of the one or more blocks of memory cells, a threshold from a set of thresholds for a quantity of access operations, data errors, or both associated with adjusting the parity scheme.

12. The non-transitory computer-readable medium of claim 9, wherein the instructions are further executable by the one or more processors to:
   determine whether a quantity of access operations performed at at least one of the plurality of blocks satisfies a threshold, the quantity of access operations including the first access operation, wherein adjusting the parity scheme is in response to the determination.

13. The non-transitory computer-readable medium of claim 9, wherein the instructions are further executable by the one or more processors to:
   determine whether a quantity of errors in a portion of the data associated with the first access operation satisfies a threshold, wherein adjusting the parity scheme is in response to the determination.

14. The non-transitory computer-readable medium of claim 13, wherein the instructions to detect the quantity of errors in the data are executable by the one or more processors to:
   perform an error control operation on the portion of the data in response to performing the first access operation.

15. The non-transitory computer-readable medium of claim 9, wherein the parity scheme and the adjusted parity scheme indicate a quantity of pages of memory cells in each of the one or more blocks of memory cells that store the data and a quantity of pages of memory cells in each of the one or more blocks of memory cells that store the parity information associated with the data.

16. The non-transitory computer-readable medium of claim 15, wherein the instructions to adjust the parity scheme are executable by the one or more processors to:
   increase the quantity of pages in each of the one or more blocks of memory cells that store parity information.

17. A method for memory operations, comprising:
   performing a first access operation according to a parity scheme at a plurality of blocks of memory cells storing data and parity information associated with the data;
   adjusting, after performing the first access operation, the parity scheme for one or more blocks of memory cells of the plurality of blocks of memory cells; and
   performing a second access operation according to the adjusted parity scheme at the one or more blocks of memory cells.

18. The method of claim 17, wherein the one or more blocks of memory cells comprise each block of memory cells of the plurality of blocks of memory cells that is of a block type, and wherein the block type indicates a quantity of bits stored by each memory cell in a block of memory cells.

19. The method of claim 17, further comprising:
   selecting, in accordance with one or more block types of the one or more blocks of memory cells, a threshold from a set of thresholds for a quantity of access operations, data errors, or both associated with adjusting the parity scheme.

20. The method of claim 17, further comprising:
   determining whether a quantity of access operations performed at at least one of the plurality of blocks satisfies a threshold, the quantity of access operations including the first access operation, wherein adjusting the parity scheme is in response to the determination.

* * * * *